United States Patent
Shibata et al.

(10) Patent No.: US 7,340,128 B2
(45) Date of Patent: Mar. 4, 2008

(54) WAVELENGTH SELECTION DEVICE

(75) Inventors: Kohei Shibata, Kawasaki (JP);
Nobuhiro Fukushima, Kawasaki (JP);
Tamotsu Akashi, Kawasaki (JP);
Toshiya Kishida, Kawasaki (JP);
Tsuyoshi Yamamoto, Kawasaki (JP);
Hirofumi Aota, Kawasaki (JP); Shinji Yamashita, Kawasaki (JP); Shinichi Takeuchi, Kawasaki (JP); Hiroyuki Furukawa, Kawasaki (JP); Yoshinobu Kubota, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/412,914

(22) Filed: Apr. 28, 2006

(65) Prior Publication Data
US 2007/0153352 A1 Jul. 5, 2007

(30) Foreign Application Priority Data
Jan. 5, 2006 (JP) .............................. 2006-000932

(51) Int. Cl.
*G02B 6/293* (2006.01)
(52) U.S. Cl. .................................................. 385/24
(58) Field of Classification Search .................. 385/15, 385/24, 31, 39
See application file for complete search history.

(56) References Cited

U.S. PATENT DOCUMENTS

| 6,381,387 | B1 | 4/2002 | Wendland, Jr. | |
| 2002/0154855 | A1* | 10/2002 | Rose et al. | 385/24 |
| 2003/0067645 | A1 | 4/2003 | Ibsen et al. | |
| 2005/0276537 | A1 | 12/2005 | Frisken | |

FOREIGN PATENT DOCUMENTS

JP 2003-069504 3/2003

OTHER PUBLICATIONS

European Patent Office Extended Search Report (for the corresponding European patent application, EP 06 00 8699), Jan. 2, 2007.
Hendrik, J. Gerritsen et al., "Rectangular surface-relief transmission gratings with a very large first-order diffraction efficiency (~95%) for unpolarized light", Applied Optics, vol. 37, No. 25, Sep. 1, 1998, pp. 5823-5823.
E.G. Loewen et al., "Grating efficiency theory as it applies to blazed and holographic gratings", Applied Optics, vol. 16, No. 10, Oct. 1977, pp. 2711-2721.
E.G. Loewen et al. "Efficiency Optimization of rectangular groove gratings for use in the visible and IR regions", Applied Optics, vol. 18, No. 13, Jul. 1, 1979, pp. 2262-2266.

* cited by examiner

*Primary Examiner*—Sarah Song
(74) *Attorney, Agent, or Firm*—Bingham McCutchen LLP (57) ABSTRACT

A housing 20 is equipped for supporting, from a side, a platform of a wavelength selection device comprising an input/output port 10, a collimator 11, an expanding optical system 12, a spectroscopic element, a collecting optical system 14 and a micro electro mechanical system (MEMS) mirror array 15. Because the above noted optical member is supported from the side only, influences of a thermal expansion is limited to the height direction of the optical member and the optical axis direction. By these aspects, the influence of thermal expansion is limited to a two-dimensional from a common three-dimensional, thereby enabling a design of a countermeasure to an influence of a thermal expansion. Also, the support from the side does not create a dead space thereby making the wavelength selection device compact.

8 Claims, 10 Drawing Sheets

WAVELENGTH SELECTION DEVICE

BACKGROUND OF THE INVENTION

1. Field of the Invention

The present invention relates to a device having one or more optical input/output and being used for selectively handling a multiplexed optical wavelength, which is used for an optical transmission system utilizing a wavelength multiplexing, and in particular to amounting structure having a small module height and also a small change of characteristics against environmental temperature variations and to a device using the aforementioned mounting structure.

2. Description of the Related Art

In an optical transmission system, the main purpose of a wavelength multiplexing was an expansion of a transmission capacity by virtue of an increased number of channels in the past. In recent years, the expected benefits are an improved added value of a transmission system and a reduction of an operation cost by an extended service menu by utilizing wavelength differences and flexible band usages.

However, sufficient benefits of a speed and a cost reduction cannot be obtained by a conventional method in which an optical signal is converted into an electric signal and handled electrically, and the electric signal is converted back into an optical signal again.

Because of this, the required is a device having a plurality of optical inputs and outputs and capable of selectively handling a wavelength multiplexed signal in the form of light.

One of such optical devices includes a wavelength selection switch which is a device capable of selectively sorting an input wavelength multiplexed signal into each wavelength.

Figure 1:
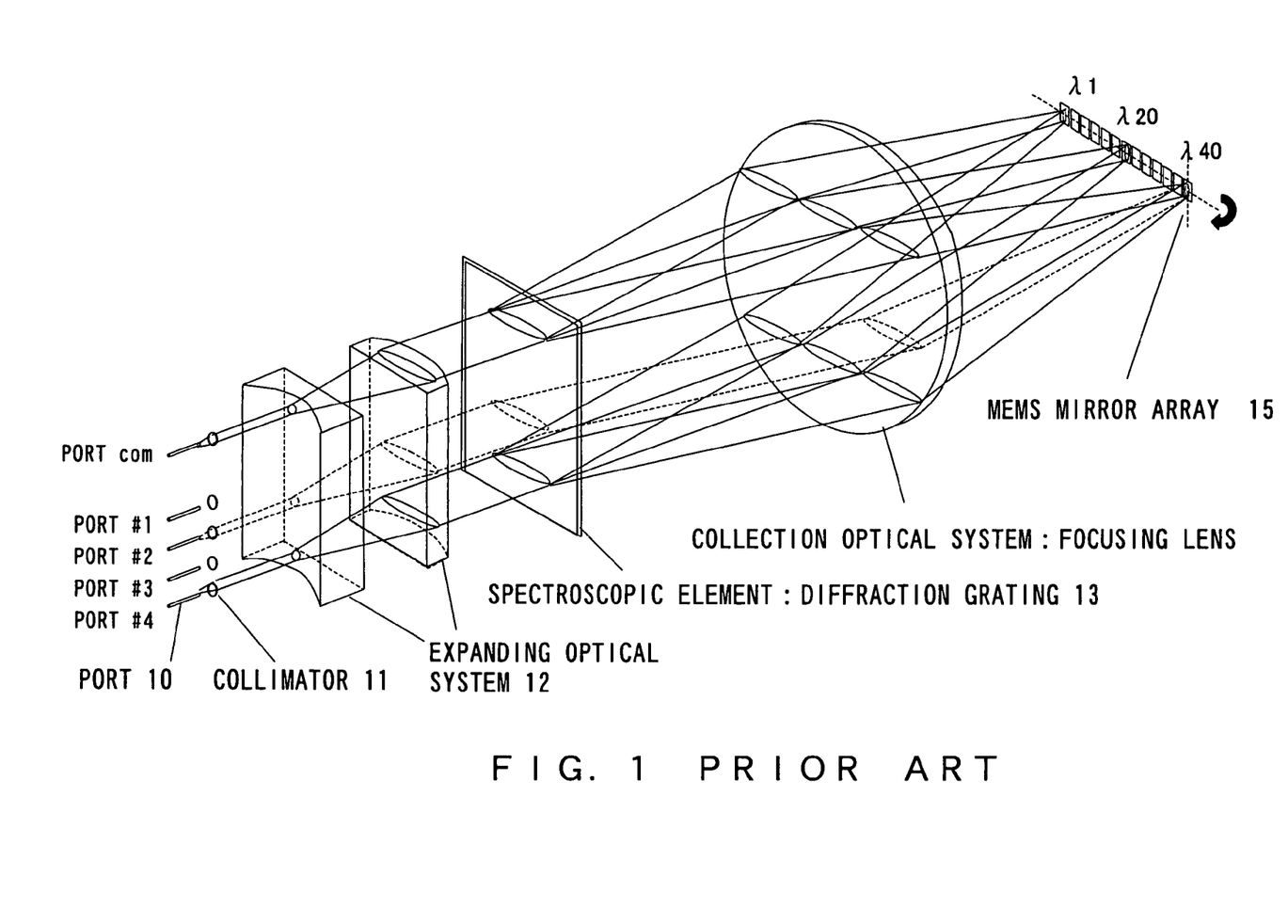
FIG. 1 shows a basic configuration example of a conventional wavelength selection switch.

FIG. 1 shows a basic configuration example of a conventional wavelength selection switch.

The wavelength selection switch shown in FIG. 1 has the minimum comprisal of a spectroscopic element (i.e., a diffraction grating) 13 for the purpose of applying a spectroscopy to a wavelength multiplexed optical signal, an input/output optical system (comprising an input optical system and an output optical system, that is, in FIG. 1, comprising a port 10 including a port COM and #1 through #4 ports, a collimator 11 and an expanding optical system 12), a collection optical system (i.e., a focusing lens) 14 and a movable reflector body (i.e., an MEMS (microelectro mechanical system) mirror array) 15 placed corresponding to wavelengths. Note that a wavelength selective optical receptor for receiving an optical signal of each wavelength is obtained by using a photo diode array in place of the MEMS mirror array 15 which is used for a wavelength selection switch. Meanwhile, the expanding optical system 12 expands an optical beam in only one direction as shown in FIG. 1. When the expanded light beam is collected by the collection optical system after applying a spectroscopy, the cross sectional feature of the light beam at the focal point is an elongated shape with the width being widened by the direction of the expanding optical system 12. That is, the light beam is focused on the MEMS mirror array 15 as a light spot having a shape of narrower width in the direction perpendicular to the direction "a". This is known as a characteristic that the light can be focused narrower as the width of the light is larger.

The spectroscopic element 13 shown in FIG. 1 is an example of using a transmission grating, and the spectroscopic element 13 disperses, and outputs, wavelength components included in the input light in different directions for respective wavelengths. The movable reflector body (i.e., an MEMS mirror array) 15 is placed in a position corresponding to each wavelength along the dispersing direction of wavelengths. Changing the angle of the movable reflector body 15 along the array direction of the port enables to distribute a wavelength input from the input port COM to a discretionary output port (i.e., one of #1 through #4 ports 10, other than the COM). Note that the spectroscopic element 13 can utilize a prism.

In this structure, the state of the focused beam on the movable reflector body is the main determination factor of a transmission characteristic of the wavelength selection switch with respect to a band, an addition loss, et cetera. Therefore, a mounting position of each component needs to be stable vis-à-vis environmental variations such as ambient temperatures in order to stably obtain a good transmission characteristic.

Structures of wavelength selection switches resilient against such environmental temperature variations are disclosed in a non-patent document 1 and a patent document 1. These structures have components of a wavelength selection switch mounted in a cylindrical housing with the center of the cylinder being a reference for the components. This places the focusing point of the movable reflector body within the cylinder plane, thereby providing a structure minimally generating a displacement due to a thermal expansion. That is, the focusing position of the movable reflector body is placed closed to the center axis of the cylinder and the cylinder expands symmetrically from the center axis toward the outside, and therefore the neighborhood of the center axis is almost immune to an influence of the thermal expansion.

[Non-patent document 1] Optical MEMS 2003, page 43
[Patent document 1] U.S. Pat. No. 6,307,657

An expansion of the number of output ports is important for a wavelength selection switch in order to improve flexibility in allocating wavelengths. As shown in FIG. 1, the structure is such that an expansion of the number of ports increases the height of a module because the expansion direction of the number of ports (i.e., the direction of increasing the number of ports 10 from the ports #1 through #4 and arraying them vertically) is perpendicular to the wavelength dispersion direction. Here, the module height is defined as a module size in the direction "a" (as shown in FIG. 1) which is the arraying direction of increased output ports in the case of increasing the number of the ports.

In the meantime, the devices are mounted on a board of a standardized board size in an optical telecommunication system. Therefore, there are limitations in the module height and area size in order to mount the devices on a standard board, requiring a module height of a wavelength selection switch to be suppressed while securing a larger number of ports.

Figure 2:
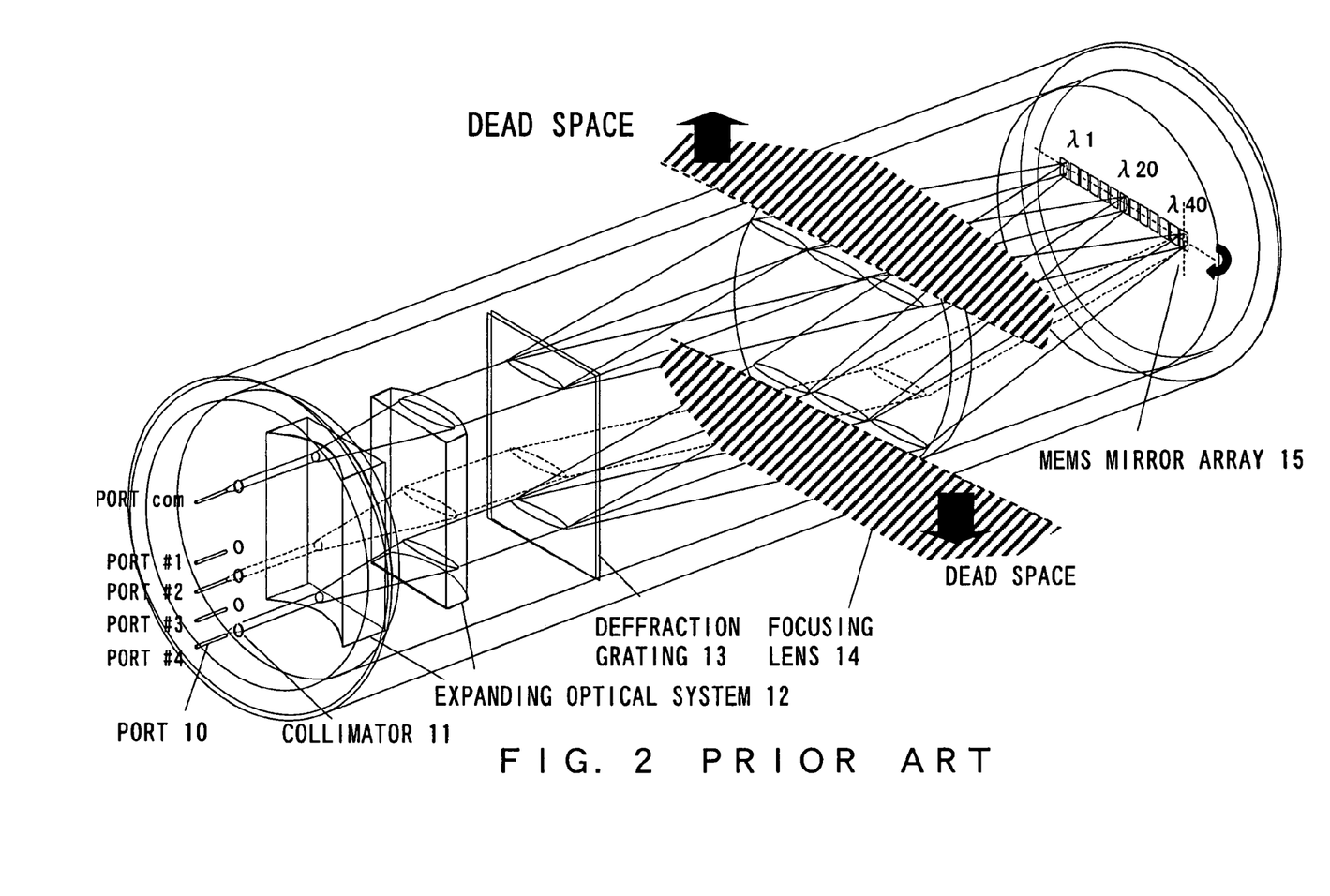
FIG. 2 shows a comprisal of a conventional wavelength selection switch.

FIG. 2 shows a comprisal of a conventional wavelength selection switch.

In FIG. 2, the same comprisal as that of FIG. 1 is assigned the same reference component number. The component assigned by the same reference number has the same function as that shown in FIG. 1.

Since the module has a cylindrical structure in the conventional technique as shown by FIG. 2, a dead space is created outside the area used for the light beam (i.e., parts shown by diagonal hatching). Therefore, it is disadvantageous in terms of suppressing the module height.

In order to accordingly suppress the module height, a compact and thin body needs to be implemented by a non-cylindrical configuration creating no dead space. Due to being a non-cylindrical configuration, however, a fluctuation of beam focusing position on the movable reflector body 15 vis-à-vis the above described environmental temperature variation tends to occur.

SUMMARY OF THE INVENTION

The object of the present invention is to provide a wavelength selection device which is compact and capable of obtaining a good transmission characteristic vis-à-vis environmental temperature variation.

A wavelength selection device according to the present invention comprises: an optical port; a spectroscopic element for applying a spectroscopy to an input light from the optical port; a collection optical system for collecting the spectroscopically split light; an optical element for receiving the collected light; and a housing for supporting the optical port, spectroscopic element, collection optical system and optical element on a plane approximately perpendicular to the spectroscopic plane of the spectroscopic element.

The wavelength selection device according to the present invention renders a benefit of reducing a change of a beam collecting state due to environmental temperature variation while suppressing a module height.

DESCRIPTION OF THE PREFERRED EMBODIMENTS

An embodiment of the present invention is configured to fix optical components constituting a wavelength selection device from a side of a housing which determines relative positions of the components with a position, as a reference, making the device approximately symmetrical when viewing it in the direction of a component height that is the direction of port expansion.

According to the above described configuration, the direction of thermal expansion of each optical component due to a variation of environmental temperatures becomes symmetrical when viewing from the center of the height direction so as to enable a suppression of relative positional changes in the height direction as compared to fixing components from the bottom. This enables a suppression of a relative positional change of the optical components because of suppression of a three-dimensional thermal expansion approximately to the two-dimensional. That is, there is no need to consider an influence of three directional thermal expansions, and instead requiring a design considering for two directional thermal expansions only.

Figure 3:
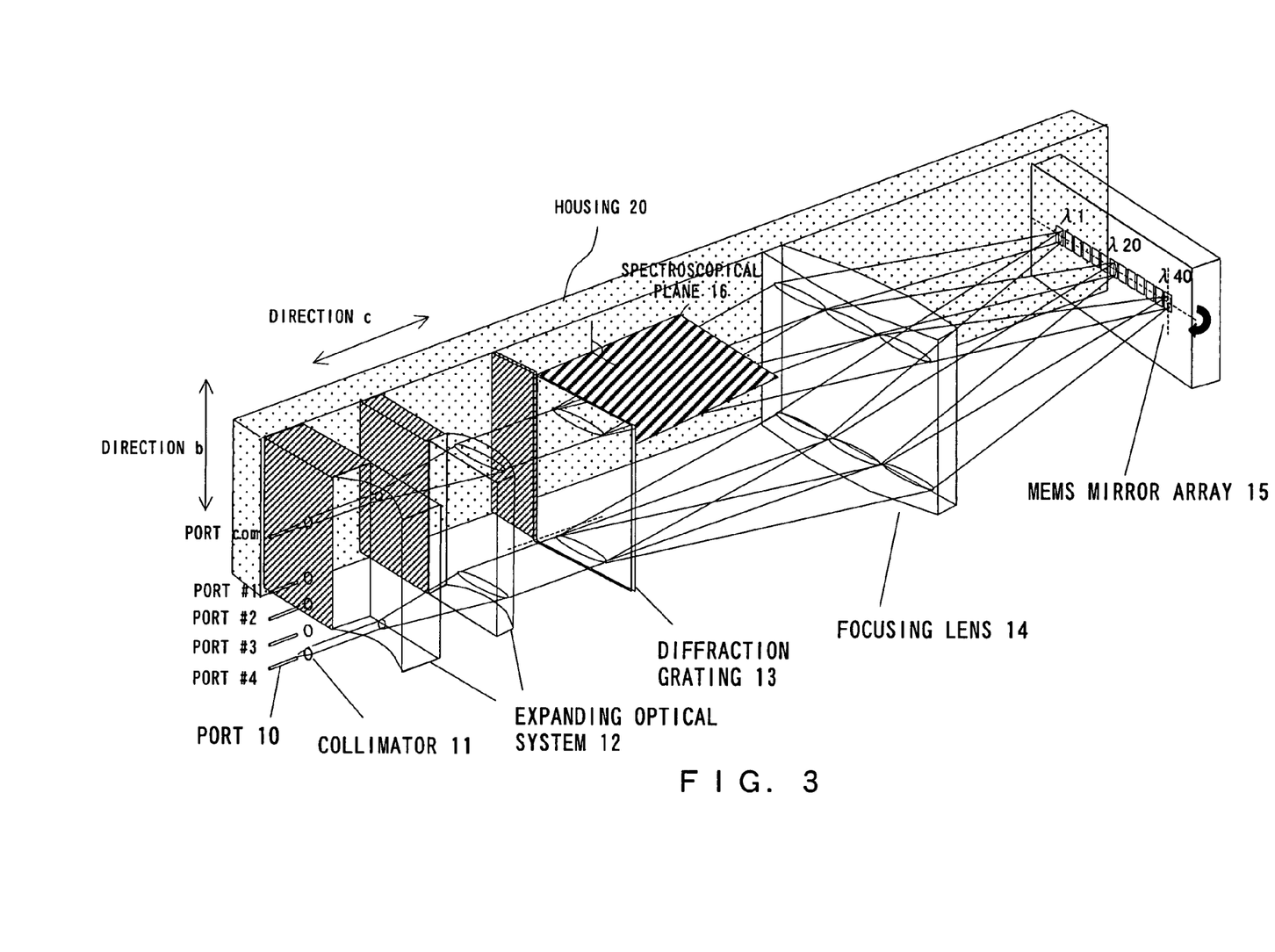
FIG. 3 is a conceptual diagram of an embodiment of the present invention.

FIG. 3 is a conceptual diagram of an embodiment of the present invention.

In FIG. 3, the same reference numbers are assigned to the same components as those shown by FIGS. 1 and 2.

In the configuration shown in FIG. 3, each optical member is supported by a housing 20 only from its side. The housing 20 is positioned to be approximately perpendicular to a spectroscopic plane 16 shown in FIG. 3. The housing 20 can also be considered to be at the right angle to the shown spectroscopic plane 16 which is one including the direction that the spectroscopy element 13 applies a spectroscopy to a light. This configuration eliminates dead spaces of all optical members which were created by the configuration shown in FIG. 2, and minimizes a module height by eliminating a bottom plate. In this case, the influences of expansions of optical members due to temperature variation are only in a one-dimensional direction in the up and down direction with the housing 20 as the reference and a positional change of the MEMS mirror array 15 in the spectroscopy direction. That is, although the housing 20 expands due to a thermal expansion, the influence appears in the directions b and c of the optical members. Furthermore, although a variation in the direction c changes the distance between the spectroscopy element 13 and MEMS mirror array 15, this appears as a change of a position of the spectroscopically split light hitting the MEMS mirror array 15 in the horizontal direction. Therefore, the influence of the thermal expansion can be absorbed if each mirror of the MEMS mirror array 15 is made larger in the horizontal direction.

Incidentally, referring to FIG. 3, an input port COM and a plurality of output ports #1 through #4 are shown as the port 10. The configuration of the port 10 is not limited as such. For example, the input port COM need not be one, but a plurality thereof may be possible. Meanwhile, although the plurality of output ports is shown in FIG. 3, there may be only one. This consideration is the same for all the following descriptions of embodiments.

Figure 4:
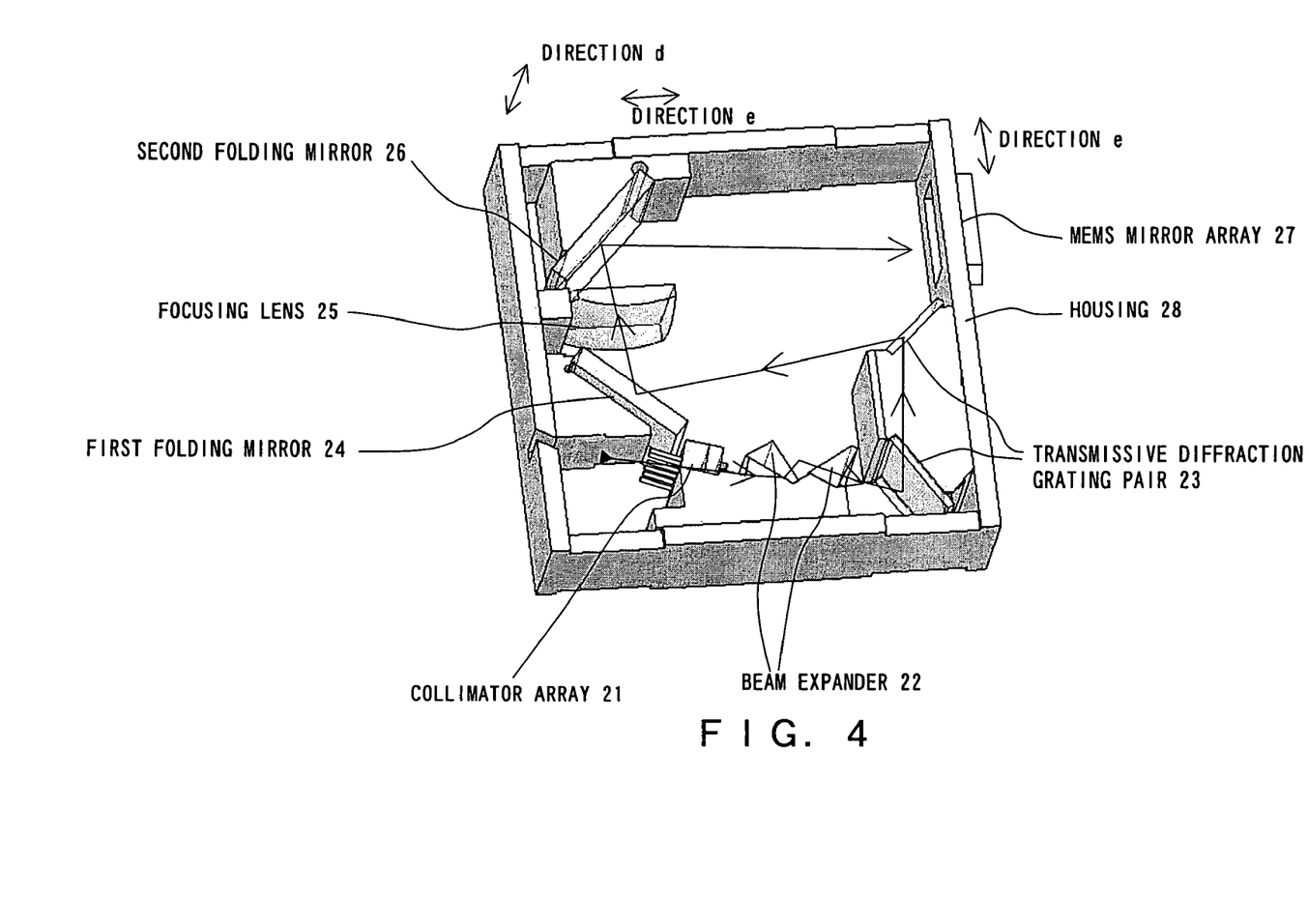
FIG. 4 exemplifies a concrete configuration of a wavelength selection device according to an embodiment of the present invention.

FIG. 4 exemplifies a concrete configuration of a wavelength selection device according to an embodiment of the present invention.

In the configuration shown in FIG. 4, a light travels in the direction of arrow. That is, the light incident from a collimator array 21 goes through a beam expander 22 and is applied a spectroscopy by a transmissive diffraction grating pair 23. The transmissive diffraction grating pair 23 comprises two diffraction gratings being arrayed so as to add the respective angular dispersion of the light. The spectroscopically split light is reflected by a first folding mirror 24, collected by a focusing lens 25 and then reflected by a second folding mirror 26. The light reflected by the second folding mirror 26 reaches an MEMS mirror array 27 which is commonly configured as one package. The inclination angle of the first and second folding mirrors 24 and 26 are approximately 45 degrees respectively.

This configuration makes a module compact by folding back the interval between the spectroscopy element (i.e., the transmissive diffraction grating pair 23) and movable reflection mirror body (i.e., MEMS mirror array 27) which is the main factor of the module length. Referring to FIG. 4, since a housing 28 supports optical members only from the side as in the case of FIG. 3, the influence of thermal expansion are only in the directions d and e. Here, the influence in the direction d does not cause a rotation on the optical members and therefore the countermeasures are required only for the individual optical members. The influence in the direction e, which is the circumferential direction of the module, causes a rotation of the optical members resulting in displacement of the light path. This phenomenon is described later. Although a linear long optical system is prone to an external vibration whose amplitude is large in the middle part of the system, hence it easily influences the optical characteristics, the compact design of the above described configuration is expected to gain a benefit of suppressing the amplitude of such vibration as aforementioned.

Figure 5:
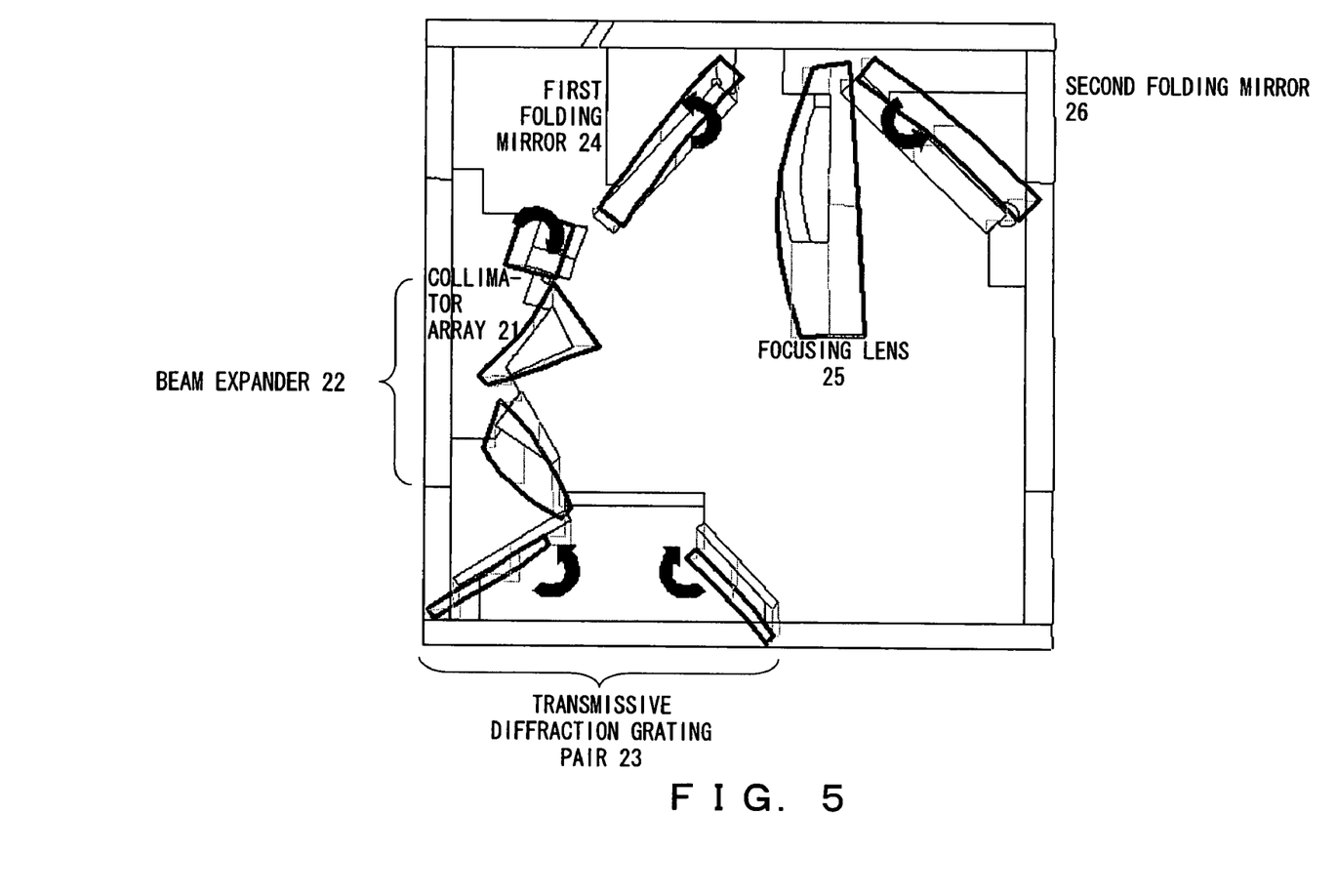
FIG. 5 illustrates changes of optical members due to an environmental temperature variation in the configuration shown by FIG. 4.

FIG. 5 illustrates changes of optical members due to an environmental temperature variation in the configuration shown in FIG. 2. Note that in FIG. 5, the same reference signs are assigned to the same configuration as in the case of FIG. 4. In the configuration shown by FIG. 5, an influence of thermal expansion in the direction e shown in FIG. 4, and other influence cause to change the optical members from what are delineated by the fine lines to what are delineated by the bold lines. This makes apparent that the first and second folding mirrors 24 and 26 rotate respectively. Although this rotation means a displacement of the light path, a proactive utilization of the displacement of the light path due to the rotation enables a correction of a displacement of a focusing position of the movable reflector body (i.e., the transmissive diffraction grating pair 23) in the spectroscopy direction influenced by a thermal expansion in the direction e, et cetera, whose correction was not possible only by the configuration shown by FIG. 4.

FIGS. 6A through 6F exemplify a configuration of a mirror holder which changes its angle according to temperature variations.

Figures 6A, 6B, 6C, 6D, 6E:
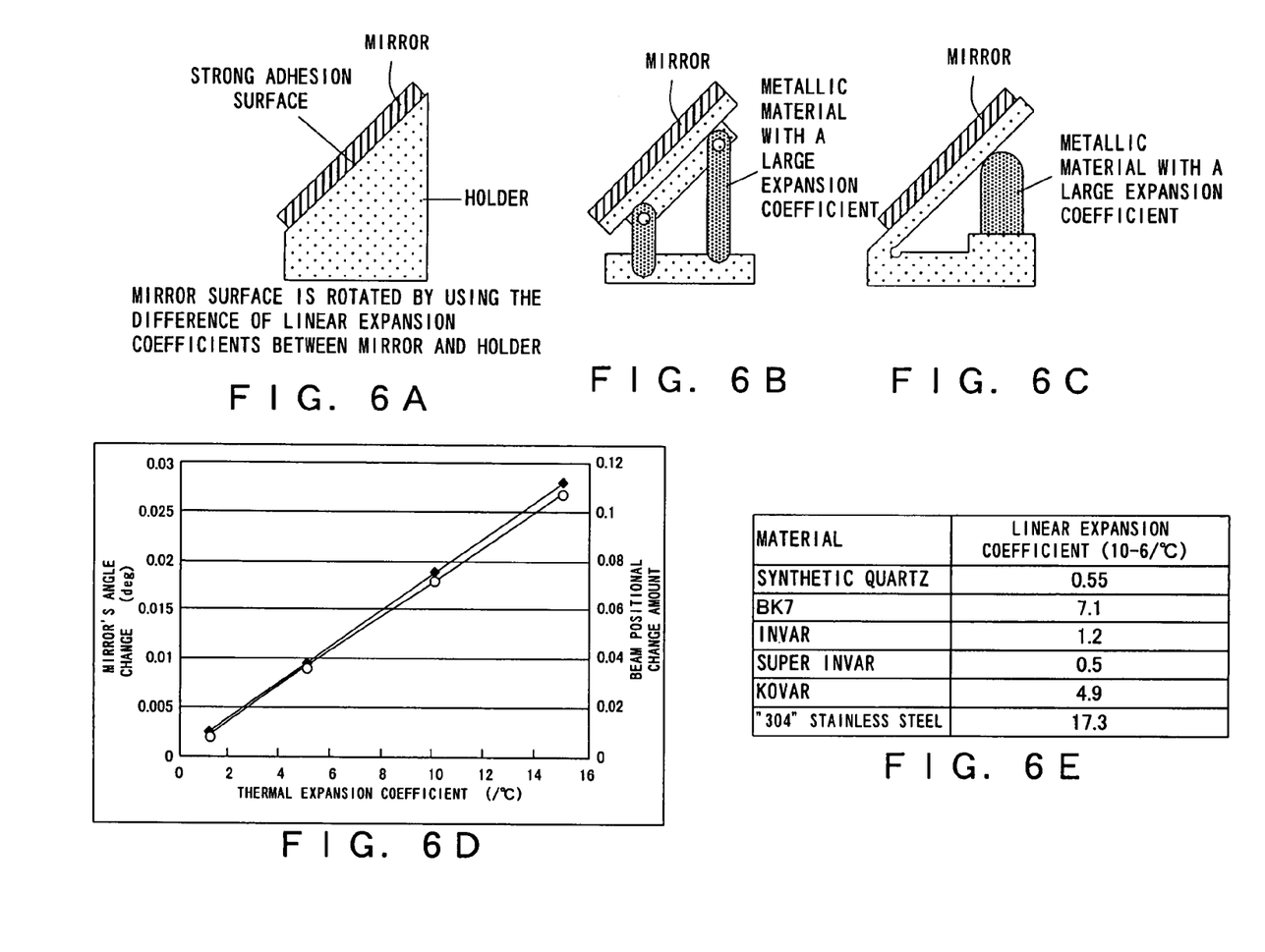
FIGS. 6A through 6E exemplify a configuration of a mirror holder which changes its angle due to temperature variation.

FIGS. 6A through 6F describe a method of proactively utilizing the rotations of the first and second folding mirrors 24 and 26 shown in FIG. 5. In order to control the rotations of the aforementioned mirrors, the configuration shown by FIG. 6A makes the mirror adhere with holders strongly by using a high strength adhesive, et cetera. Then, a mirror surface is rotated by the same principle as a bimetal element, i.e., by the difference in expansion coefficients between the mirror material and holder material. As shown in FIG. 6D, a rotating amount of the mirror surface, that is, a changing amount of the beam position can be adjusted by selecting a material of the holder (or the mirror) FIGS. 6B and 6C exemplify methods for pushing out the mirror surface by the difference of expansion coefficients. These configurations have structures for allowing inclination angles of the mirror surfaces to be variable and adopt a metallic material of the mirror supports having large expansion coefficients. An appropriate selection of expansion coefficients of metallic materials enables a design of a suitable mirror rotation amount.

As for a material selection method for the mirror and holder, a design engineer can only select a material by using a table of respective materials and their linear expansion coefficients as shown by FIG. 6E in addition to FIG. 6D.

Figure 7A:
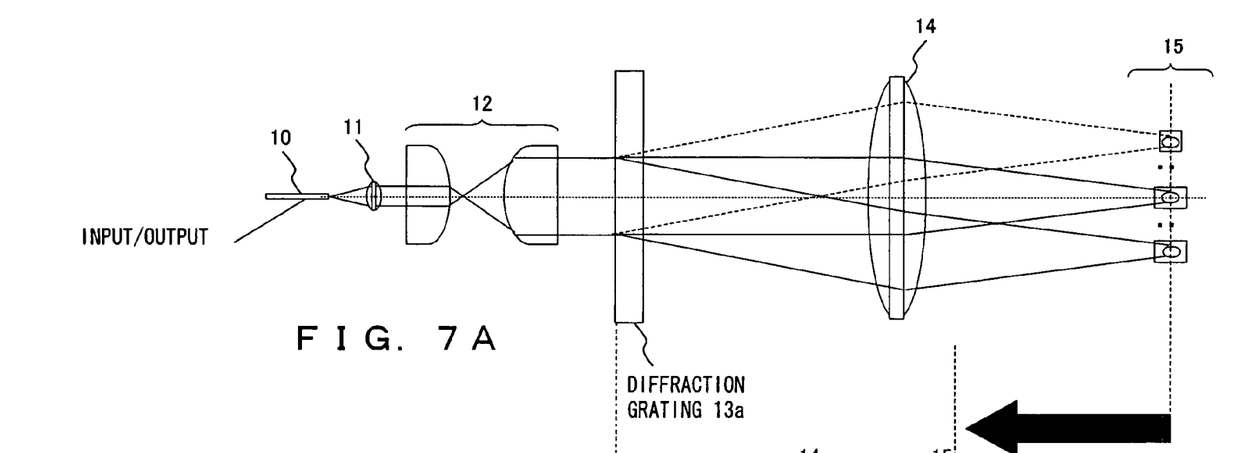
FIGS. 7A and 7B explain a benefit of using two diffraction gratings in a wavelength selection device.
Figure 7B:
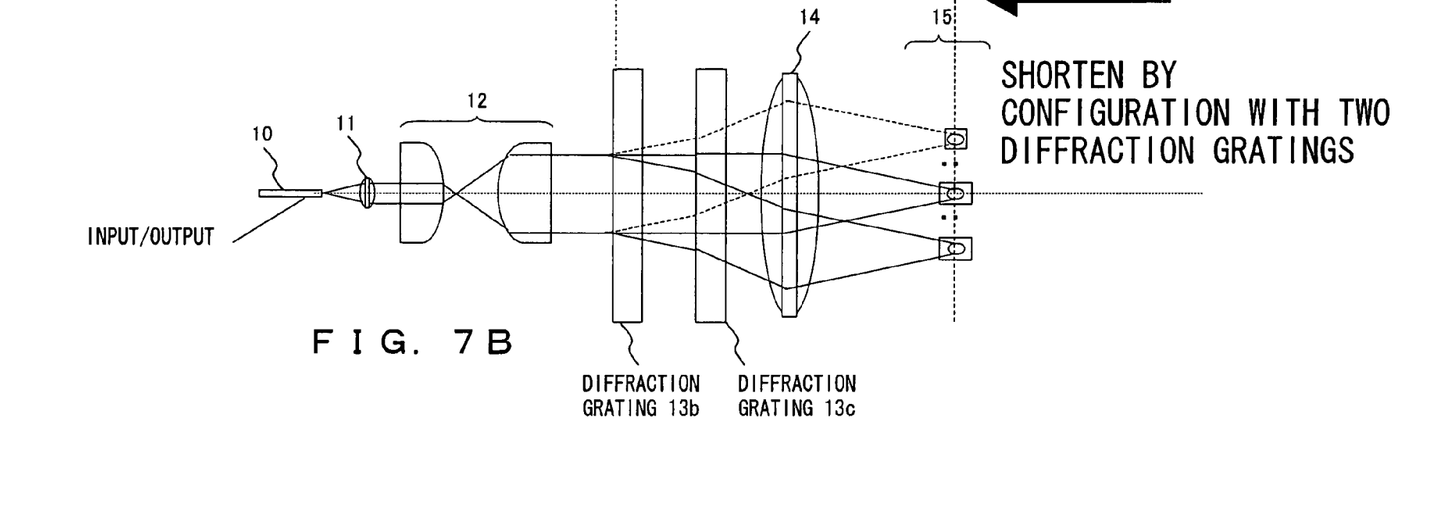

FIGS. 7A and 7B explain a benefit of using two diffraction gratings in a wavelength selection device.

In FIGS. 7A and 7B, the same reference signs are assigned for the same components as in the case of FIG. 3 and descriptions thereof are omitted here.

As shown by FIG. 7A, if an amount of angular dispersion of a diffraction grating 13a is not sufficient, the distance between the diffraction grating 13a and MEMS mirror array 15 must be set greater so that the collecting positions of spectrocopically split lights match with the respective mirror intervals of the MEMS mirror array 15. In such a case, it is possible to increase an amount of angular dispersion by equipping two diffraction gratings 13b and 13c so as to apply a comprisal for having a light pass through two diffraction gratings with their rulings approximately parallel with each other as shown in FIG. 7B. By this configuration, it is possible to shorten the distance between the diffraction gratings 13b and 13c and MEMS mirror array 15. That is, this configuration provides the benefit of reducing the distance between the spectroscopy elements 13b and 13c and the movable body reflector mirror 15, which is the main factor of a module length, thereby making the module compact. Here, the described is a configuration to equip with two diffraction gratings, the number thereof, however, is usually immaterial.

Figure 8:
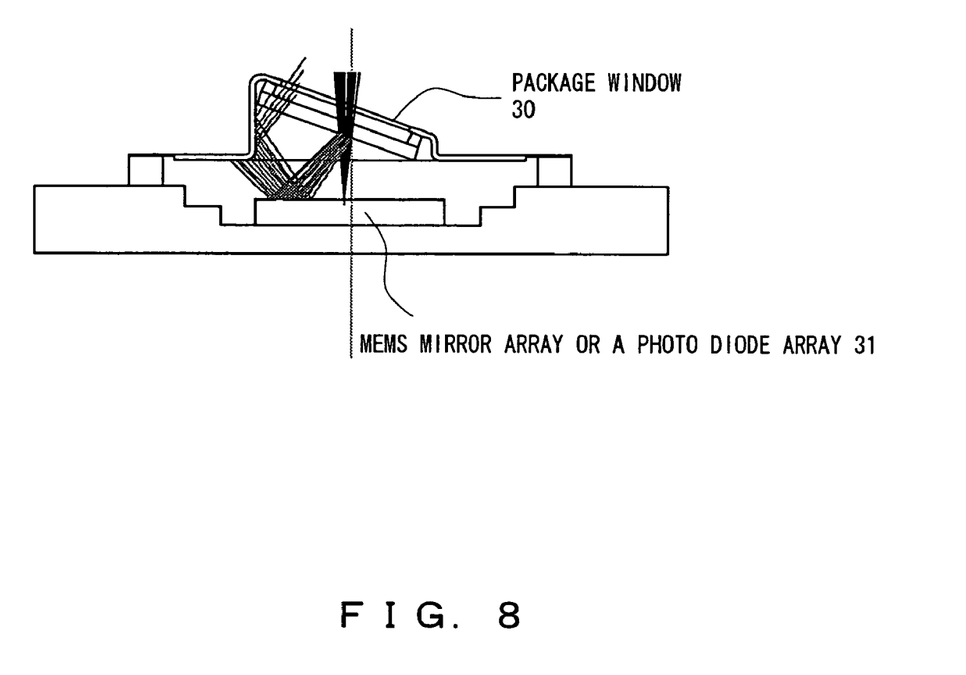
FIG. 8 explains a ghost light.

FIG. 8 explains a ghost light.

An MEMS mirror array, or a photo diode array 31, is preferably configured to be an individual package in consideration of its producibility. However, there is a possibility of an input light is incident by an angle close to perpendicular to a package window 30 in the wavelength selection device according to an embodiment of the present invention, and therefore a ghost light is generated at an output port because a return loss amount at the package window is finite.

Accordingly, in the case of making the MEMS mirror array or photo diode array 31 as an individual package, it is possible to suppress a generation of a ghost light by making a package window 30 inclined, thereby orienting the reflecting light at the package window 30 totally to other directions as shown in FIG. 8. Note that the inclination angle of the package window 30 is empirically known to be five degrees or greater.

Figure 9:
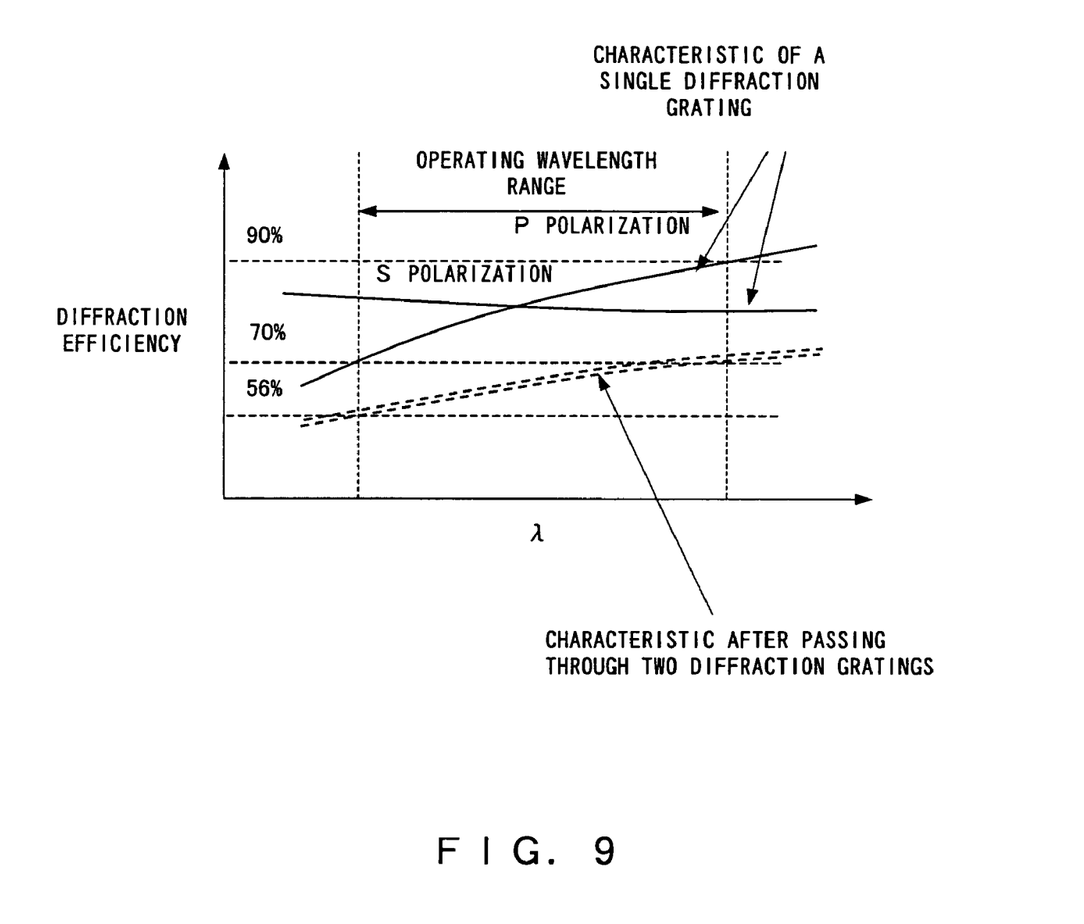
FIG. 9 explains a method for improving a polarization dependency of a wavelength selection device.

FIG. 9 explains a method for improving a polarization dependency of a wavelength selection device.

A polarization dependency of a wavelength selection device occurs mainly in a diffraction grating. A diffraction efficiency of a single diffraction grating indicates different characteristics between P polarization and S polarization as shown by solid lines in FIG. 9. Accordingly, use of a wavelength plate makes a polarization state exchanged when passing through diffraction gratings for the even number of times (i.e., typically twice). This cancels the polarization dependency as shown by the dotted lines in FIG. 9.

Figure 10:
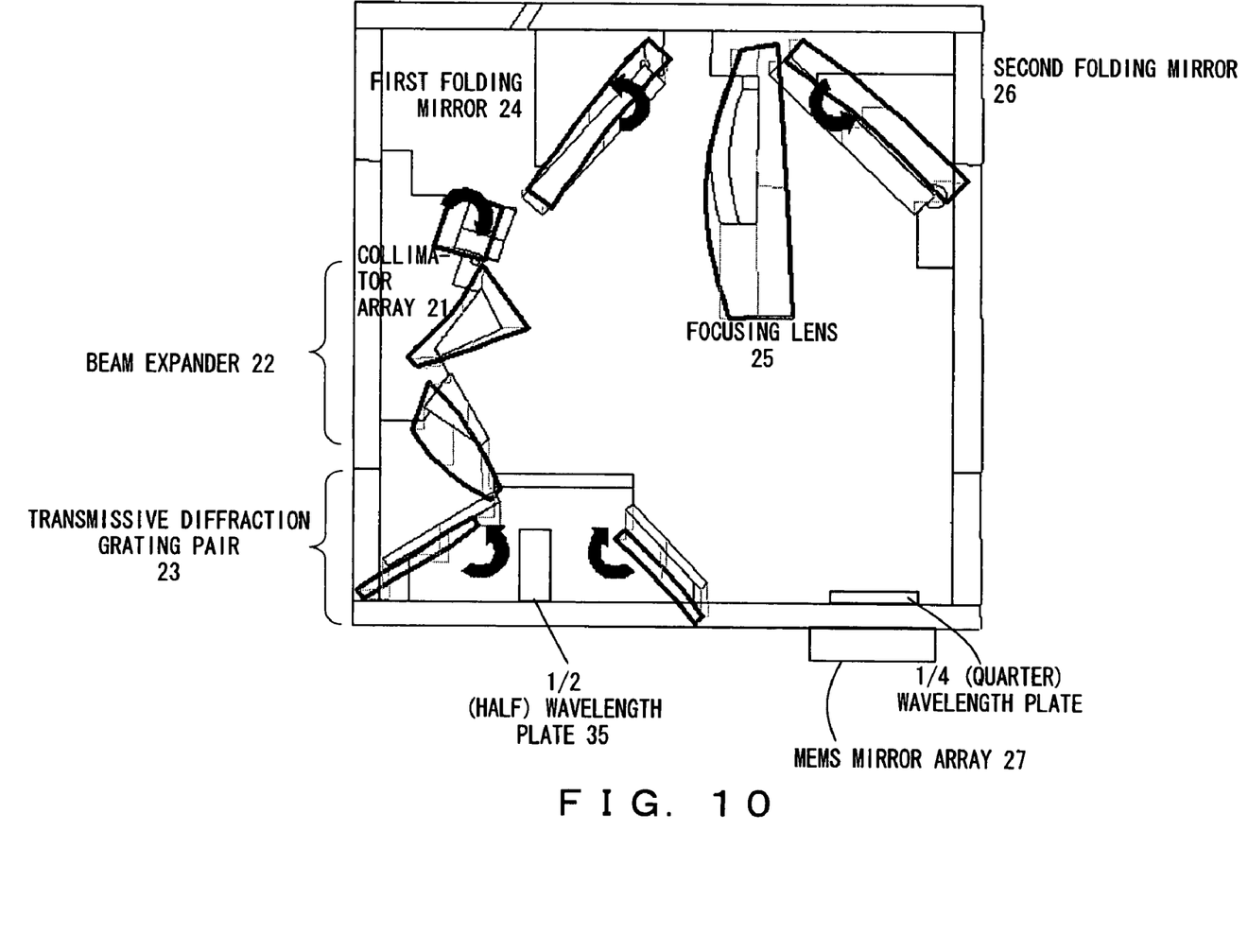
FIG. 10 explains a method for placing a wavelength plate.

FIG. 10 describes a method for placing a wavelength plate.

In FIG. 10, the same reference signs as those of FIG. 4 are assigned to the same components as in the case of FIG. 4.

A wavelength plate for canceling a polarization dependency of a diffraction efficiency of the transmissive diffraction grating pair 23 can be equipped between the diffraction gratings thereof or the front part of the MEMS mirror array 27. Because either case needs to change over the P and S polarizations, the equipping of the wavelength plate is such as to displace the phase of a light in the states of both the P and S polarizations by a total of a half wavelength from the light input to the output. In the case of equipping a wavelength plate between the diffraction gratings of the transmissive diffraction grating pair 23, a ½ (half) wavelength plate 35 is installed. In the case of equipping a wavelength plate in front of the MEMS mirror array 27, a ¼ (quarter) wavelength plate 36 is installed.

As described thus far, the wavelength selection device comprising a wavelength selection platform according to an embodiment of the present invention is compact and also capable of indicating a good transmission characteristic.

What is claimed is:

1. A wavelength selection device, comprising:
   an optical port;
   a spectroscopic element for applying spectroscopy to an input light from the optical port;
   a collection optical system, comprising a lens, for collecting the spectroscopically split light;
   mirrors, mounted on mirror holders which are made from materials having different linear expansion coefficients, for folding a light path in the front and rear of the lens;
   an optical element for receiving the collected light; and
   a housing for supporting the optical port, spectroscopic element, collection optical system and optical element on a plane approximately perpendicular to the spectroscopic plane of the spectroscopic element,
   wherein said housing has a rectangular shape within which said optical port, spectroscopic element, collection optical system and optical element are fixed, and wherein
   said lens is adapted to rotate according to a variation of environmental temperature and to compensate for a displacement of an optical path formed by optical members fixed onto said housing due to an environmental temperature variation by rotation of mirrors caused by temperature deformation of mirror holders which differs for materials of different expansion coefficients.

2. The wavelength selection device according to claim 1, wherein said optical element is a photo diode.

3. The wavelength selection device according to claim 1, wherein
   said optical port comprises an input-use port and a plurality of output-use ports, and
   said optical element is a micro electro mechanical system (MEMS) mirror array, wherein
   the MEMS mirror array reflects a light input from the input-use port and spectroscopically split, and inputs the light to a respectively different output-use fiber for each wavelength.

4. The wavelength selection device according to claim 1, wherein
   said optical port comprises a plurality of input-use ports and a plurality of output-use ports, and
   said optical element is a micro electro mechanical system (MEMS) mirror array, wherein
   the MEMS mirror array reflects a light input from an input-use port selected for each wavelength and inputs the light to an output-use port.

5. The wavelength selection device according to claim 1, further comprising
   an expanding optical system between said optical port and spectroscopic element for expanding a width of a light beam.

6. The wavelength selection device according to claim 1, wherein
   said spectroscopic element comprises a plurality of diffraction gratings placed so as to add angular diffusion directions.

7. The wavelength selection device according to claim 1, wherein
   said optical element is housed by a package having a window for allowing light to pass, and the window is inclined vis-à-vis a light path.

8. The wavelength selection device according to claim 1, wherein
   said spectroscopic element comprises one or more diffraction gratings, and
   the wavelength selection device comprises a wavelength plate on a light path for changing over between a P polarization and an S polarization of a light, wherein
   the light passes through the diffraction grating in a state of the P and S polarizations being changed over.

* * * * *